United States Patent
Girardier et al.

(10) Patent No.: US 12,002,472 B2
(45) Date of Patent: Jun. 4, 2024

(54) RELAY DEVICE FOR VOICE COMMANDS TO BE PROCESSED BY A VOICE ASSISTANT, VOICE ASSISTANT AND WIRELESS NETWORK

(71) Applicant: Google LLC, Mountain View, CA (US)

(72) Inventors: Thomas Girardier, Bourg la Reine (FR); Vincent Nallatamby, Paris (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/619,344

(22) PCT Filed: Dec. 9, 2020

(86) PCT No.: PCT/EP2020/085220
§ 371 (c)(1),
(2) Date: Dec. 15, 2021

(87) PCT Pub. No.: WO2021/116152
PCT Pub. Date: Jun. 17, 2021

(65) Prior Publication Data
US 2022/0301567 A1    Sep. 22, 2022

(30) Foreign Application Priority Data
Dec. 9, 2019 (EP) .................................... 19306609

(51) Int. Cl.
*G10L 15/30*    (2013.01)
*G10L 15/22*    (2006.01)
(Continued)

(52) U.S. Cl.
CPC .............. *G10L 15/30* (2013.01); *G10L 15/22* (2013.01); *H04L 67/125* (2013.01); *H04W 4/80* (2018.02); *G10L 2015/223* (2013.01)

(58) Field of Classification Search
USPC ..................................................... 704/1–504
See application file for complete search history.

(56) References Cited

U.S. PATENT DOCUMENTS 8,825,020 B2 * 9/2014 Mozer ................. H04L 12/2818
704/270.1
11,523,254 B2 * 12/2022 Deixler ............... H04W 64/003
(Continued)

FOREIGN PATENT DOCUMENTS

CN    105700389 A    6/2016
CN    114556805 A  * 5/2022    ............. G06F 3/167
(Continued)

OTHER PUBLICATIONS

Extendend European Search Report for European Application No. 119306609.9, dated Jul. 3, 2020, 11 pages.
(Continued)

*Primary Examiner* — Marcus T Riley
(74) *Attorney, Agent, or Firm* — Kilpatrick Townsend & Stockton LLP

(57) ABSTRACT

The present disclosure relates to a relay device of a wireless network, said wireless network comprising a plurality of network nodes mutually connected by wireless links. The relay device is configured to receive a voice command by a microphone of a source node, determine a recipient voice assistant for processing the voice command, and transmit, towards the recipient voice assistant, an output signal comprising the voice command. The present disclosure relates also to a voice assistant and to a wireless network, and to methods for processing voice commands by a relay device and a voice assistant.

15 Claims, 3 Drawing Sheets

(51) Int. Cl.
*H04L 67/125* (2022.01)
*H04W 4/80* (2018.01)

(56) References Cited

U.S. PATENT DOCUMENTS

| | | | |
|---|---|---|---|
| 2013/0183944 A1* | 7/2013 | Mozer | H04L 12/2818 455/414.1 |
| 2016/0012827 A1* | 1/2016 | Alves | G10K 11/17857 381/71.1 |
| 2016/0275961 A1* | 9/2016 | Yu | H04M 9/082 |
| 2018/0061420 A1 | 3/2018 | Patil et al. | |
| 2018/0247645 A1* | 8/2018 | Li | G06F 3/167 |
| 2018/0301147 A1 | 10/2018 | Kim | |
| 2019/0051289 A1* | 2/2019 | Yoneda | G06F 3/167 |
| 2019/0079724 A1* | 3/2019 | Feuz | G06F 3/167 |
| 2020/0293116 A1* | 9/2020 | Udall | G06V 10/147 |
| 2021/0185485 A1* | 6/2021 | Deixler | G01S 7/006 |
| 2021/0329165 A1* | 10/2021 | Liu | G06F 21/6245 |
| 2022/0150004 A1* | 5/2022 | Deixler | H04W 72/0453 |
| 2022/0199079 A1* | 6/2022 | Hanson | H04L 51/02 |
| 2022/0301567 A1* | 9/2022 | Girardier | G10L 15/30 |
| 2023/0048423 A1* | 2/2023 | Deixler | H04W 4/029 |
| 2023/0222531 A1* | 7/2023 | Cella | G06Q 10/06315 705/7.31 |

FOREIGN PATENT DOCUMENTS

| | | | | |
|---|---|---|---|---|
| EP | 3836582 A1 | * | 6/2021 | G06F 3/167 |
| EP | 4013085 A1 | * | 6/2022 | G06F 3/167 |
| WO | WO-2021116152 A1 | * | 6/2021 | G06F 3/167 |

OTHER PUBLICATIONS

International Search Report and Written Opinion for Internation Application No. PCT/EP2020/085220, dated Mar. 17, 2021, 17 pages.
Extended European Search Report for European Patent Application No. 22155621.0 dated May 13, 2022. 8 pages.

* cited by examiner

RELAY DEVICE FOR VOICE COMMANDS TO BE PROCESSED BY A VOICE ASSISTANT, VOICE ASSISTANT AND WIRELESS NETWORK

CROSS-REFERENCE TO RELATED APPLICATIONS

This application is a national phase entry under 35 U.S.C. § 371 of International Application No. PCT/EP2020/085220 filed Dec. 9, 2020, which claims priority from European Patent Application No. 19306609.9 filed Dec. 9, 2019, all of which are hereby incorporated herein by reference.

TECHNICAL FIELD

This disclosure relates to a relay device for relaying voice commands to be processed by a voice assistant, to a voice assistant adapted to process such relayed voice commands, and to a wireless network comprising a voice assistant and a relay device.

BACKGROUND ART

Voice assistants are becoming increasingly popular. Voice assistants are passive listening devices that respond once they recognize a voice trigger (such as "Hello voice assistant"). They use speech recognition algorithms to detect keywords in a user spoken request. Such voice assistants are connected to the Internet so they can then send the parsed request to a remote server that will compute the appropriate response.

Such voice assistants are able to process requests issued only by users in their immediate vicinity, such that it is usually not possible to cover an entire apartment or house with a single voice assistant.

In order to be able to issue requests to voice assistants from a plurality of positions within e.g. a same house, it is known to embed multiple voice assistants in different electronic devices such as in a television, in a speaker, in a smartphone, in a smartwatch, etc. All these voice assistants are standalone in the sense that they comprise the complete voice assistant software (speech recognition algorithms, etc.) and are connected to the Internet in order to send the parsed request to a remote server and receive the response computed by the remote server. This limits the voice assistant usage to expensive electronic devices, as they must have enough capabilities to run the full software and must integrate at least e.g. a Wi-Fi chipset (or any other chipset that allows having an Internet connection), plugged in or with high battery capacity. Recently, some Bluetooth speakers, equipped with a microphone, started to only implement the detection of the voice trigger. Once the voice trigger is detected, such Bluetooth speakers establish a Bluetooth voice link with a voice assistant they are paired with, in order to transfer the voice command to it so the response can be determined. This is advantageous as the detection of the voice trigger requires fewer resources (both in terms of performances and costs) than the full voice assistant software.

In that case, it is possible to some extent to expand the coverage area of a voice assistant, since it can process requests received from a user in the vicinity of said Bluetooth speaker. The associated complexity increase in terms of resources is lower than providing two standalone voice assistants, since the Bluetooth speaker implements only the detection of the voice trigger, while it is the voice assistant that processes the voice command and determines the response, optionally via a remote server.

However, deployed voice assistants use a Bluetooth protocol version which allows only a one to one voice link, such that these voice assistants can only communicate with a single remote device, which limits drastically the achievable coverage area expansion. Also, the achievable coverage area expansion is also limited by the maximum range of the Bluetooth protocol.

SUMMARY

The present disclosure aims at proposing a solution for expanding the coverage area of voice assistants, in a way enabling to reduce the number of voice assistants required to cover a given area, such as an apartment or a building, in order to create "ambient" or "ubiquitous" voice assistants.

Also, the present disclosure aims at allowing, in some embodiments at least, this coverage area expansion to be achieved even for existing voice assistants that might be drastically restricted in the number of simultaneous voice links that can be established.

For this purpose, and according to a first aspect, the present disclosure relates to a relay device comprising a processing circuit and a wireless communication unit for connecting to a wireless network, said wireless network comprising a plurality of network nodes mutually connected by wireless links, wherein said relay device is configured to:
- receive, by the wireless communication unit, an input signal from a source node connected to the wireless network, said input signal comprising a voice command received by a microphone of the source node, said voice command to be processed by a voice assistant;
- determine, by the processing circuit and based on the input signal, a recipient voice assistant connected to the wireless network and adapted for processing said voice command;
- transmit, by the wireless communication unit and towards the recipient voice assistant, an output signal comprising the voice command.

Hence, such a relay device can relay voice commands received from a source node of the wireless network towards a voice assistant of the wireless network. In other words, a voice command can reach the voice assistant through multiple hops within the wireless network, thereby increasing the coverage area of said voice assistant.

A wireless network comprises, or preferably consists in, a plurality of network nodes mutually connected by wireless links only. Hence, any network node of the wireless network can communicate with any other network node of the wireless network by using exclusively wireless links, directly (through a single wireless link/hop) and/or indirectly (through multiple wireless links/hops). Such a wireless network can therefore use any topology to the extent that all links between network nodes are wireless links. The wireless network can be connected, by means of at least one of its network nodes, to a wired network. The wireless network can be either homogeneous or heterogeneous. In a homogeneous wireless network, all wireless links use the same wireless communication protocol. In a heterogeneous wireless network, not all wireless links use the same wireless communication protocol, and some wireless links can use a first wireless communication protocol, e.g. a Bluetooth protocol, while some other wireless links can use a second wireless communication protocol, different from the first wireless communication protocol, e.g. a Wi-Fi protocol.

Hence, the relay device can receive the voice command directly from the source node (single hop) or indirectly (multiple hops, through at least one other relay device). Similarly, the relay device can transmit the voice command toward the determined recipient voice assistant either directly (single hop) or indirectly (multiple hops, through at least one other relay device).

In specific embodiments, the relay device can further comprise one or more of the following features, considered either alone or in any technically possible combination.

In a specific embodiment, the wireless communication unit comprises at least one of the following:
- a Bluetooth communication unit;
- a Wi-Fi communication unit;
- a Zigbee communication unit.

In a specific embodiment, the processing circuit is configured to determine the recipient voice assistant by performing at least one of the following:
- extracting an identifier of said voice assistant from the input signal;
- searching for at least one predetermined word in the input signal;
- using a topology of the wireless network.

In a specific embodiment, the processing circuit is further configured to determine a path to the recipient voice assistant based on a topology of the wireless network, and to use said path when transmitting the voice command towards the recipient voice assistant.

According to a second aspect, the present disclosure relates to a method for processing, by a relay device connected to a wireless network, an input signal comprising a voice command to be processed by a voice assistant, said wireless network comprising a plurality of network nodes mutually connected by wireless links, wherein said method comprises:
- receiving an input signal from a source node connected to the wireless network, said input signal comprising a voice command received by a microphone of the source node;
- determining, based on the input signal, a recipient voice assistant connected to the wireless network and adapted for processing said voice command;
- transmitting, towards the recipient voice assistant, an output signal comprising the voice command.

According to a third aspect, the present disclosure relates to a computer program product comprising instructions which, when executed by a relay device comprising a wireless communication unit and a processing circuit, configure said relay device to carry out a method for processing an input signal according to any one of the embodiments of the invention.

According to a fourth aspect, the present disclosure relates to a voice assistant comprising a processing circuit and a wireless communication unit for connecting to a wireless network, said wireless network comprising a plurality of network nodes mutually connected by wireless links, wherein said voice assistant is configured to:
- receive, by the wireless communication unit, at least two input signals, each input signal comprising a voice command received by a microphone of a source node of the wireless network;
- determine, by the processing circuit, whether the voice commands of said input signals correspond to a same request issued by a single user;
- if said voice commands correspond to a same request issued by a single user: determine a single response to the voice commands based on at least one of said voice commands;
- if said voice commands correspond to different requests: determine a response for each different voice command.

Indeed, in a wireless network comprising at least one relay device arranged to relay voice commands, a voice assistant can receive multiple voice commands. However, in some cases, voice commands can correspond to a same request issued by a same user. Indeed, a same request can be received by different source nodes which might be connected to the voice assistant through a same relay device or through respective different relay devices. It is also possible that one of the source nodes is connected directly to the voice assistant, in which case the same request is received directly from this source node and indirectly from the other source node, through a relay device. Hence, the voice assistant is preferably arranged to detect whether or not voice commands received through different paths correspond to a same request issued by a single user, in order to avoid determining multiple responses to a single request.

In specific embodiments, the voice assistant can further comprise one or more of the following features, considered either alone or in any technically possible combination.

In a specific embodiment, the processing circuit is further configured to, if said voice commands correspond to a same request issued by a single user, process said voice commands to produce an enhanced voice command, and determine the single response based on the enhanced voice command.

In a specific embodiment, the processing circuit is further configured to, if said voice commands correspond to a same request issued by a single user, process the corresponding input signals to determine position information for the user, and determine the single response based on the position information.

In a specific embodiment, the processing circuit is further configured to, if said voice commands correspond to different requests having respective priorities, determine the respective responses in an order determined based on the respective priorities of the requests.

In a specific embodiment, the processing circuit is further configured to, if an input signal includes position information for the user having issued the corresponding request, extract said position information from the input signal and determine the response based on the position information.

In a specific embodiment, determining the response comprises selecting at least one response node of the wireless network based on the position information for the user, and commanding the at least one response node to perform at least one action determined in response to the request.

According to a fifth aspect, the present disclosure relates to a method for processing voice commands by a voice assistant connected to a wireless network, said wireless network comprising a plurality of network nodes mutually connected by wireless links, wherein said method comprises:
- receiving at least two input signals from at least one relay device of the wireless network, each input signal comprising a voice command received by a respective microphone of a source node of the wireless network;
- determining whether the voice commands of said input signals correspond to a same request issued by a single user;

if said voice commands correspond to a same request issued by a single user: determining a single response to the voice commands based on at least one of said voice commands;

if said voice commands correspond to different requests: determining a response for each different voice command.

According to a sixth aspect, the present disclosure relates to a computer program product comprising instructions which, when executed by a voice assistant comprising a wireless communication unit and a processing circuit, configure said voice assistant to carry out a method for processing voice commands according to any one of the embodiments of the invention.

According to a seventh aspect, the present disclosure relates to a wireless network comprising a plurality of network nodes mutually connected by wireless links, wherein at least one network node is a source node comprising a microphone, at least one network node is a voice assistant according to any one of the embodiments of the invention, and at least one network node is a relay device according to any one of the embodiments of the invention.

In a specific embodiment, the wireless network can comprise at least one of the following:

a Bluetooth Low Energy, BLE, mesh network;
a Bluetooth piconet;
a Wi-Fi network.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

DESCRIPTION OF EMBODIMENTS

Figure 1:
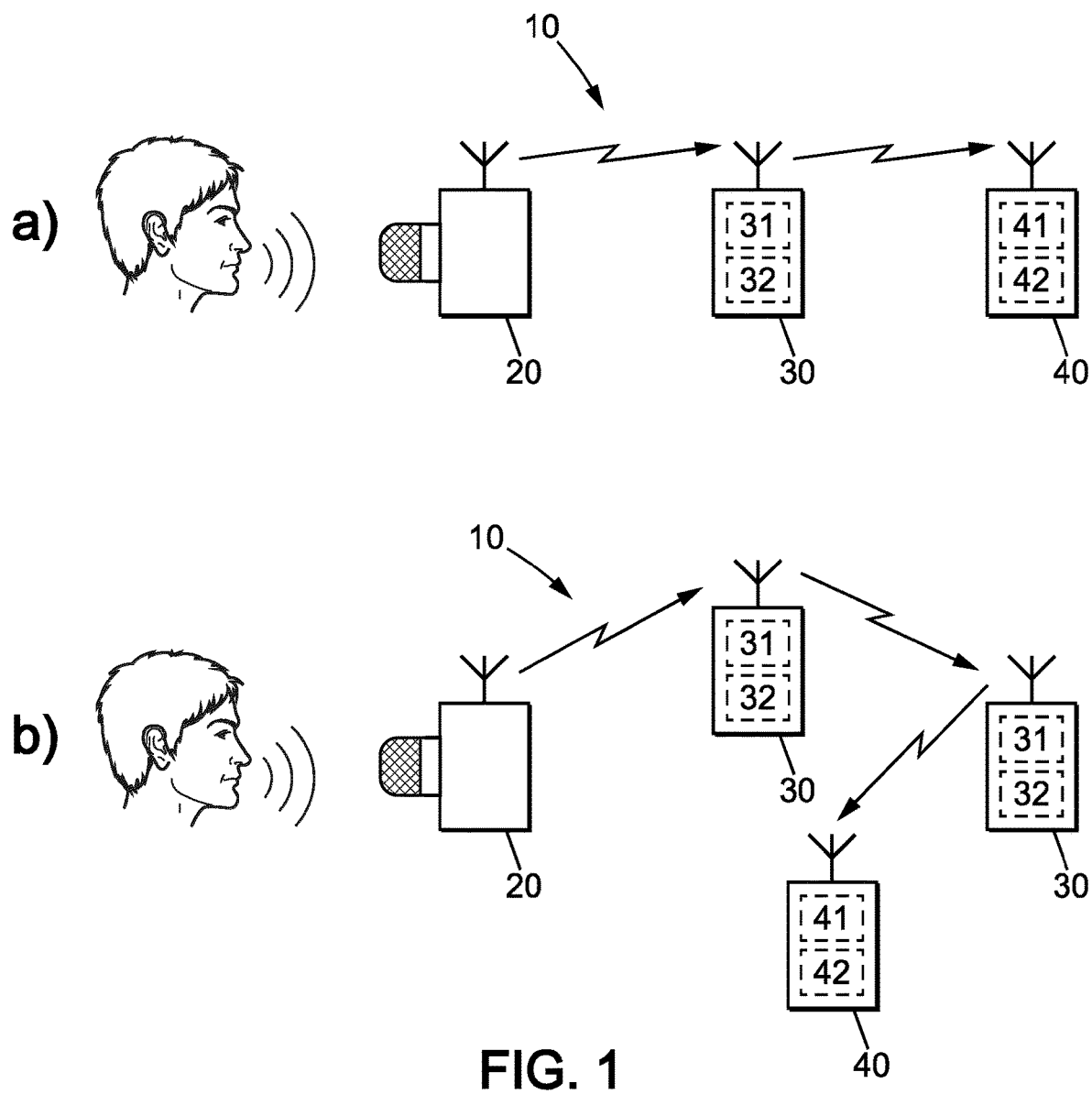
FIG. 1: a schematic representation of exemplary wireless networks comprising at least one relay device.

FIG. 1 represents schematically exemplary wireless networks 10 comprising a plurality of network nodes mutually connected by wireless links.

In the exemplary embodiment depicted in part a) of FIG. 1, the network nodes of the wireless network 10 consist in:

a source node 20 comprising a microphone (not represented in the figures), adapted to digitize spoken requests issued by a user in order to obtain a voice command;

a voice assistant 40 for processing voice commands corresponding to spoken requests issued by a user;

a relay device 30 for relaying voice commands from the source node 20 to the voice assistant 40.

In the exemplary embodiment depicted in part b) of FIG. 1, the wireless network 10 comprises two relay devices 30, and a voice command issued by the source node 20 is successively relayed by a first relay device 30 and by a second relay device 30 before reaching the voice assistant 40.

Of course, the wireless network 10 can comprise a different number of network nodes and/or can have a different topology than the wireless networks 10 represented in FIG. 1. In particular, the wireless network 10 can comprise:

multiple source nodes 20, preferably distributed in a given area (e.g. a house, a building, etc.) such as to be able to record a spoken request from any position within said given area;

multiple relay devices 30, preferably distributed in said given area such as to be able to forward a voice command from any source node 20 to a voice assistant 40;

multiple voice assistants 40, which can correspond to e.g. voice assistants from different manufacturers, one or multiple response nodes 50 each adapted to perform one possible action for responding to a request; for example a response node 50 can comprise at least one among the following: a speaker, a screen, an actuator (e.g. for turning ON/OFF a light, a television, an oven, a radiator, etc.), etc.

Of course, a network node can implement multiple functions.

For example, a source node 20 can also be a relay device 30 and/or a response node 50. Similarly, a relay device 30 can also be a source node 20 and/or a response node 50, and even a voice assistant 40 if the wireless network comprises a plurality of voice assistants 40, etc.

Each network node of the wireless network 10 comprises a wireless communication unit in order to connect to the wireless network 10, i.e. in order to establish a wireless link with at least one other network node of the wireless network 10. Each wireless communication unit supports at least one wireless communication protocol.

In the present disclosure, a "(spoken) request" corresponds to the acoustic signal issued by a user. A "voice command" corresponds to a digital signal obtained by at least digitizing the analog audio signal issued by the microphone in response to the reception of the spoken request. The voice command can correspond to a digital audio signal or to pre-processed data derived from the digital audio signal, for instance a list of words extracted from the digital audio signal. Also, the "voice command" corresponds to the useful part of the spoken request, i.e. the data which corresponds to the actual request for which a response is to be determined (e.g. "What time is it?", "Please increase the temperature in the living room", "What is the weather forecast for tomorrow?", etc.). A "voice trigger" is similar to a voice command (i.e. digital audio signal or pre-processed data derived from said digital audio signal) but corresponds to the control part of the spoken request which is used to detect that the acoustic signal includes a request to be processed by a voice assistant (e.g. "Hello voice assistant", etc.).

As illustrated in FIG. 1, the relay device 30 comprises a wireless communication unit 31 and a processing circuit 32.

For example, the processing circuit 32 comprises one or more processors and storage means (magnetic hard disk, solid-state disk, optical disk, electronic memory, etc.) in which a computer program product is stored, in the form of a set of program-code instructions to be executed in order to implement all or a part of the steps of a method 60 for processing input signals comprising voice commands. Alternatively, or in combination thereof, the processing circuit 32 can comprise one or more programmable logic circuits (FPGA, PLD, etc.), and/or one or more specialized integrated circuits (ASIC), and/or a set of discrete electronic components, etc., adapted for implementing all or part of said steps of the processing method 60.

For example, the wireless communication unit 31, coupled to the processing circuit 32, corresponds to a radiofrequency circuit comprising components (antenna(s), amplifier(s), local oscillator(s), mixer(s), analog and/or digital filter(s), etc.) considered known to the skilled person. As discussed above, the wireless communication unit 31 implements at least one wireless communication protocol. For instance, the wireless communication unit 31 can comprise at least one of the following:

a Bluetooth communication unit;
a Wi-Fi communication unit;
a Zigbee communication unit.

In other words, the processing circuit 32 and the wireless communication unit 31 of the relay device 30 form a set of means configured by software (specific computer program product) and/or by hardware (processor, FPGA, PLD, ASIC, discrete electronic components, radiofrequency circuit, etc.) to implement all or part of the steps of a method 60 for processing, by the relay device 30, input signals comprising voice commands.

Figure 2:
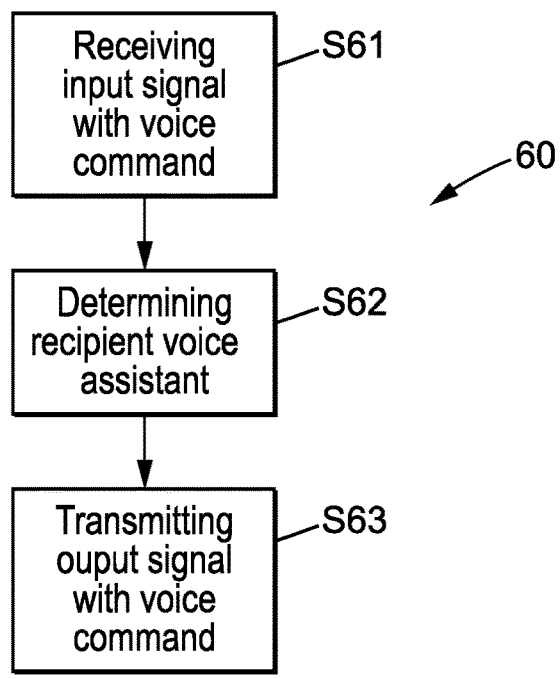
FIG. 2: a diagram representing the main steps of an exemplary method for processing, by a relay device, input signals comprising voice commands to be processed by a voice assistant.

FIG. 2 represents schematically the main steps of a method 60 for processing, by a relay device 30, input signals comprising voice commands to be processed by a voice assistant 40 of the wireless network 10.

As illustrated by FIG. 2, said processing method 50 comprises the following steps, executed by the relay device 30:

a step S61 of receiving an input signal from a source node 20 connected to the wireless network 10, said input signal comprising a voice command received by a microphone of the source node 20;

a step S62 of determining, based on the input signal, a recipient voice assistant 40 connected to the wireless network and adapted for processing said voice command;

a step S63 of transmitting, towards the recipient voice assistant 40, an output signal comprising the voice command.

During step S61, the wireless communication unit 31 of the relay device 30 receives an input signal that comprises a voice command received by a microphone of a source node 20. As discussed above, the input signal can be received directly from the source node 20, or indirectly through at least one other relay device 30. The input signal can comprise also, in addition to the voice command, the voice trigger of the spoken request. The voice command (and, where applicable, the voice trigger) can correspond to a digital audio signal, or to pre-processed data derived from the digital audio signal, for instance a list of words detected in the digital audio signal.

During step S62, the processing circuit 32 of the relay device 30 determines, based on the input signal, a recipient voice assistant 40 connected to the wireless network 10 and adapted for processing said voice command.

For example, if there is a single voice assistant 40 connected to the wireless network 10, step S62 can reduce to retrieving the identifier of said voice assistant 40 in storage means of the relay device 30. It is also possible that a default voice assistant 40 is defined for the wireless network 10, in which case the relay device 30 can retrieve the identifier of said default voice assistant 40 in storage means of the relay device 30.

According to another example, if there are at least two voice assistants 40 connected to the wireless network 10, step S62 can comprise for instance searching for at least one predetermined word (i.e. keyword) in the input signal. For instance, if the input signal includes a voice trigger which includes a name of the voice assistant (e.g. "Hello Siri" for a voice assistant manufactured by Apple®, "Hello Google" for a voice assistant manufactured by Google®, "Hello Alexa" for a voice assistant manufactured by Amazon®, etc.), then it is possible to search for a predetermined name (e.g. "Siri", "Google", "Alexa", etc.) in the voice trigger. Hence, if the wireless network 10 comprises voice assistants developed by different manufacturers, it is possible determine which of the voice assistants 40 connected to the wireless network 10 is the recipient voice assistant for the received voice command. Searching for a predetermined word in the input signal, e.g. in the voice trigger, can use any method known to the skilled person. For instance, it is possible to use speech recognition algorithms, or to compute a similarity with each of reference words stored in storage means of the relay device 30, etc.

According to yet another example, if there are at least two voice assistants 40 connected to the wireless network 10, step S62 can comprise for instance using a topology of the wireless network 10. For example, if the topology (or at least part of the topology) is known to the relay device 30, then it is possible to e.g. select the closest voice assistant 40 (e.g. in terms of number of hops required for reaching the voice assistant, or time required for reaching said voice assistant, etc.) as the recipient voice assistant 40.

It should be noted that the above examples are non-limitative and can e.g. also be combined. For example, if there are multiple voice assistants from a same manufacturer, it is possible to select the closest voice assistant 40 corresponding to the name (e.g. "Siri", "Google", "Alexa", etc.) extracted from the voice trigger included in the input signal.

Regardless whether there is one or several voice assistants 40 in the wireless network 10, step S62 can also reduce to e.g. extracting the identifier of the recipient voice assistant 40 from the input signal. Indeed, the identifier of the recipient voice assistant can be directly included in the input signal, together with the voice command, e.g. if said identifier has been included in the input signal by the source node 20 that has previously determined the recipient voice assistant 40 and/or by another relay device 30 that has previously determined said recipient voice assistant 40.

In combination with or as an alternative to the examples above, step S62 of determining the recipient voice assistant 40 can also comprise determining that the input signal received comprises a voice command that is to be processed by a voice assistant 40. For instance, it is possible that the source node 20 does not perform any detection of a voice trigger in the digital audio signal, and that it is the relay device 30 that needs to determine whether or not the digital audio signal, included in the input signal, includes a voice trigger. In that case, the relay device 30 can search for a voice trigger in the digital audio signal received by applying methods known to the skilled person. If the relay device 30 detects a voice trigger, then said relay device 30 forwards the voice command to a voice assistant 40. If the relay device 30 does not detect a voice trigger, the digital audio signal received is not forwarded to a voice assistant 40.

In order to reduce the amount of data to be exchanged between source nodes 20 and relay devices 30, the determination of whether a digital audio signal includes a voice command is preferably performed by the source nodes 20. For instance, a source node 20 can e.g. determine that a digital audio signal includes a voice command when it detects a trigger. The trigger can be a voice trigger to be detected in the digital audio signal, or a manual trigger caused by e.g. the user pushing a button on the source node 20 or on a remote control of the source node 20 before issuing the spoken request (in which case the remote control may be a network node of the wireless network 10), etc.

For the purpose of the present disclosure, an identifier of the recipient voice assistant 40 can be any identification information that unambiguously identifies a voice assistant 40 within the wireless network 10. Such an identifier can be e.g. a MAC address, an IP address, an ID in a mesh network, etc.

During step S63, the wireless communication unit 31 of the relay device 30 transmits, towards the recipient voice assistant 40, an output signal which includes the voice command. It should be noted that the relay device 30 can forward the voice command as received, or it can pre-process it before forwarding said voice command to the recipient voice assistant 40. Hence, the processing applied usually by a standalone voice assistant can be distributed between the source node 20, the relay device 30 and the recipient voice assistant 40, to the extent the recipient voice assistant 40 always computes at least the response to the user's request (optionally using a remote server).

As discussed above, the relay device 30 can transmit the voice command to the recipient voice assistant 40 directly (single hop) or indirectly (multiple hops, through at least one other relay device 30).

In some embodiments, the processing circuit 32 of the relay device can for example determine a path to the recipient voice assistant 40 based on a topology of the wireless network 10. The determined path is then used when transmitting the voice command towards the recipient voice assistant. A path typically consists in a list of network nodes of the wireless network 10 that need to be travelled through in order to deliver the voice command to the recipient voice assistant 40. Of course, the list may be empty if the recipient voice assistant 40 can be reached directly by the relay device 30.

It should be noted that the relay device 30, when transmitting the output signal, can use the same wireless communication protocol as the one used for receiving the input signal, or can use a different wireless communication protocol. For instance, if using a different wireless communication protocol, the relay device 30 can use e.g. a Bluetooth protocol for receiving the input signal including the voice command, and can use e.g. a Wi-Fi protocol for transmitting the output signal including the voice command, and vice versa.

Also, when using the same wireless communication protocol for receiving the input signal and transmitting the output signal, the relay device 30 can use different versions of said wireless communication protocol for receiving and transmitting. For instance, the relay device 30 can use a version 3.0 or earlier of the Bluetooth protocol for receiving, and use a version 4.0 or later of the Bluetooth protocol for transmitting, in order to e.g. use the Bluetooth Low Energy, BLE, technology when relaying a voice command. Also, the relay device 30 can use a version of the Bluetooth protocol that does not support mesh networking for receiving (e.g. version 4.0 or earlier), and use a version of the Bluetooth protocol that supports mesh networking for transmitting (version 5.0 or later).

The above description has focused mainly on the request link i.e. on the communication from the source node 20 to the recipient voice assistant 40. Of course, the relay device 30 can also be used for the response link, i.e. for the communication from the recipient voice assistant 40 to the response node 50, which can be the source node 20 or a network node different from the source node 20. This might depend on the user's request, since not all requests need to involve a response node 50 belonging to the wireless network 10. Also, the response link may not need to be a voice link. For instance, if the request is "Increase the temperature in the living room", the response will be mainly to increase the temperature setpoint of the radiator in the living room (of course a voice response link may also be established to further notify the user that the request has been taken into account).

Hence, the relay device 30 is used on the request link, which is a voice request link which can be a unidirectional unicast link (for example an A2DP link for the Bluetooth protocol), a bidirectional unicast link (for example an HFP link for the Bluetooth protocol) or a broadcast link. The relay device 30 may also be used on the response link, which may be a voice response link which can be a unidirectional unicast link, a bidirectional unicast link or a broadcast link.

Hence, the coverage area of any voice assistant 40 can be drastically extended by using one or multiple relay devices 30. Such relay devices 30 need not to be standalone voice assistants, and in particular they do not need to implement the complete voice assistant software, and they do not need to compute the response to a spoken request. Hence, the requirements in terms of resources required for a relay device 30 are lower than for a voice assistant 40. Also, a relay device 30 can collect voice commands from multiple source nodes 20, and forward these voice commands to the recipient voice assistant by using a single one to one voice link. Hence, such a solution can also be used to extend the coverage area of existing voice assistants.

As illustrated in FIG. 1, the voice assistant 40 comprises a wireless communication unit 41 and a processing circuit 42.

For example, the processing circuit 42 comprises one or more processors and storage means (magnetic hard disk, solid-state disk, optical disk, electronic memory, etc.) in which a computer program product is stored, in the form of a set of program-code instructions to be executed in order to implement all or a part of the steps for processing voice commands. Alternatively, or in combination thereof, the processing circuit 42 can comprise one or more programmable logic circuits (FPGA, PLD, etc.), and/or one or more specialized integrated circuits (ASIC), and/or a set of discrete electronic components, etc., adapted for implementing all or part of said steps.

For example, the wireless communication unit 41, coupled to the processing circuit 42, corresponds to a radiofrequency circuit comprising components (antenna(s), amplifier(s), local oscillator(s), mixer(s), analog and/or digital filter(s), etc.) considered known to the skilled person. As discussed above, the wireless communication unit 41 implements at least one wireless communication protocol. For instance, the wireless communication unit 41 can comprise a Bluetooth communication unit, a Wi-Fi communication unit, etc.

In other words, the processing circuit 42 and the wireless communication unit 41 of the voice assistant 40 form a set of means configured by software (specific computer program product) and/or by hardware (processor, FPGA, PLD, ASIC, discrete electronic components, radiofrequency circuit, etc.) to implement all or part of the steps for processing, by the voice assistant 40, input signals comprising voice commands.

As discussed above, the present disclosure may be used with existing voice assistants.

However, in preferred embodiments, the voice assistant 40 may also be configured to take into account the fact that it can receive voice commands indirectly, through one or more relay devices 30. For instance, the voice assistant 40 may receive multiple voice commands which correspond in fact to a same request issued by a single user. As discussed above, this can occur e.g. if a same request is received by different source nodes 20 which might be connected to the voice assistant 40 through a same relay device 30 or through respective different relay devices 30. It is also possible that one of the source nodes 20 is connected directly to the voice assistant 40, in which case the same request is received directly from this source node 20 and indirectly from the other source node 20, through a relay device 30, etc.

Figure 3:
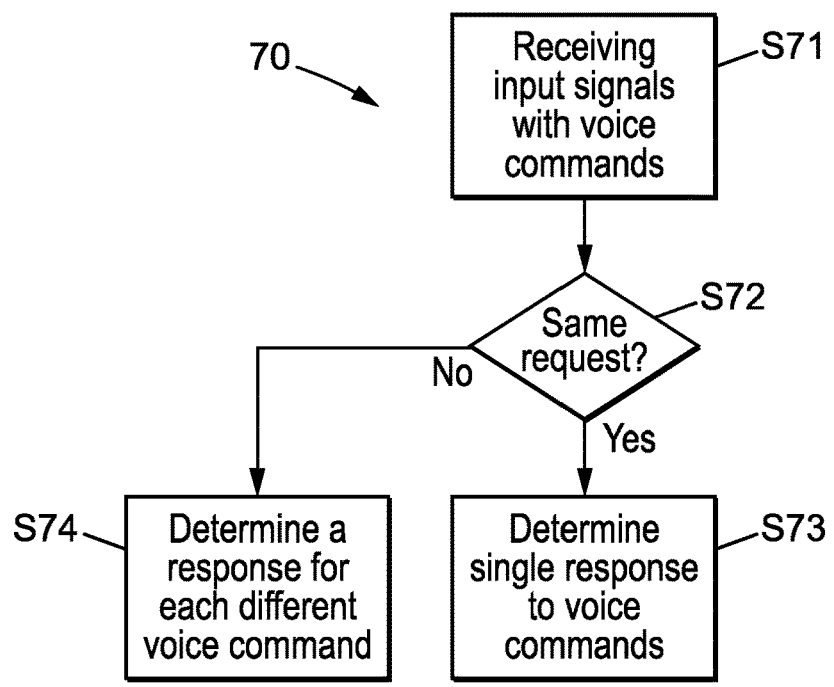
FIG. 3: a diagram representing the main steps of an exemplary method for processing, by a voice assistant, multiple voice commands received from the wireless network.

FIG. 3 represents schematically the main steps of an exemplary embodiment of a method 70 for processing, by a voice assistant 40, input signals comprising voice commands which might correspond to a same request issued by a single user. As illustrated by FIG. 3, said processing method 70 comprises the following steps, executed by the voice assistant 40:
- a step S71 of receiving at least two input signals, at least one input signal being received from a relay device 30 of the wireless network 10, each input signal comprising a voice command received by a microphone of a source node 20 of the wireless network 10;
- a step S72 of determining whether the voice commands of said input signals correspond to a same request issued by a single user;
- if said voice commands correspond to a same request issued by a single user: a step S73 of determining a single response to the voice commands based on at least one of said voice commands;
- if said voice commands correspond to different requests: a step S74 of determining a response for each different voice command.

During step S71, the wireless communication unit 41 of the voice assistant 40 receives inputs signal that comprise respective voice commands.

During step S72, the processing circuit 42 of the voice assistant 40 determines whether or not the voice commands received correspond to a same request issued by a same user.

It should be noted that, in principle, voice commands corresponding to a same user request should be received close in time. Hence, step S72 may reduce, in some embodiments, to determining whether said voice commands are received within a predetermined time period, if the probability to receive simultaneously different requests from different users is assumed to be low.

Alternatively or in addition, step S72 can comprise e.g. comparing the voice commands in order to determine whether or not they correspond to a same request. For instance, if the voice commands correspond to digital audio signals, the voice assistant 40 can e.g. correlate the digital audio signals in order to obtain a similarity value. If the similarity value is above a predetermined threshold, then the voice commands are considered to correspond to a same request. If not, the voice commands are considered to correspond to different requests.

If the voice commands are considered to correspond to different requests, then the voice assistant 40 determines a response for each different voice command during step S74.

The response can be determined completely by the voice assistant 40. Alternatively, the voice assistant 40 can use another equipment such as a remote server (not represented in the figures) in order to determine the response.

If the voice commands are considered to correspond to different requests, then these different voice commands can be processed on a first come first serve basis. Alternatively, the voice assistant 40 may determine the responses to the different voice commands according to respective priorities of the requests. For instance, in some embodiments, the voice assistant 40 can be configured to detect predetermined words in each voice command, representative of high priority requests. For example, if the voice assistant 40 detects words such as "urgent", "important", "police", "emergency", etc., in the voice command, the corresponding request is assigned a high priority and is processed first. Alternatively or in combination, different users may be assigned different priorities. In that case, the voice assistant 40 can e.g. analyze the voice command in order to identify the user who has spoken the corresponding request, and process the request based on the priority assigned to the identified user.

If the voice commands are considered to correspond to a same request from a same user, then the voice assistant 40 determines a single response to said voice commands which correspond to a same request, by using at least one of said voice commands, during step S73.

According to a first example, when determining a single response to voice commands which correspond to a same request, the voice assistant 40 can e.g. select one voice command among said voice commands, and can use only the selected voice command. For instance, each source node 20 can provide a level of confidence of a voice command transmitted, for instance a signal to noise ratio, SNR, or a received signal strength indicator, RSSI, of said voice command. In that case, the voice assistant 40 can select the voice command that has the highest level of confidence.

According to a second example, the voice assistant 40 can process said voice commands to produce an enhanced voice command. For instance, if the voice commands are received as digital audio signals, the voice assistant 40 can combine said voice commands in order to improve the SNR. Such a combination can be e.g. a simple coherent addition of the digital audio signals, or a more complex combination which can take into account the respective SNRs or RSSIs of said voice commands (e.g. maximum ratio combining, MRC, etc.). More generally speaking, any method known to the skilled person for combining different replicas of a same signal in order to improve the SNR of said signal may be implemented.

When determining a response to a given request, the voice assistant 40 can, depending on the request, determine at least one action to be performed by at least one response node. In some cases, the response node may be a remote equipment which does not belong to the wireless network 10. In some other cases, the response node may a network node of the wireless network 10. For instance, the selection of the response node depends on the action to be performed, since the response node has to be capable of performing the action. For example, if the action corresponds to issuing an audio response to the user, then the response node has to comprise e.g. a speaker or earphones, and can be the source node 20 if said source node 20 comprises a speaker and/or earphones. According to another example, the response node can be an actuator (e.g. for turning ON/OFF a light, a television, an oven, a radiator, etc.) connected to the wireless network 10. Also, the response node may be identified in the voice command and retrieved therefrom (e.g. "turn on the TV", "turn off the oven", etc.).

In some embodiments, the response can be determined based on position information for the user that issued the corresponding request. Indeed, in some cases, it might be advantageous to e.g. select the response node based on the position of the user. For instance, if the response includes an audio or video response for the user, it might be advantageous to select the speaker or screen that is the closest to the user in order to provide the audio or video response in an effective manner. If knowing the room in which is located the user might be sufficient in some cases, some other cases would benefit from knowing at least roughly where the user is located in the room.

In some embodiments, the position information for the user can be included in the input signal received. In that case, the voice assistant 40 can simply extract the position information from the input signal, and use the extracted position information to determine the response (e.g. to determine the most appropriate response node). For instance, the position of the user may be assumed to be almost the same as the position of the source node 20, which might be known. Hence, the position information in the input signal might be the position of the source node 20 (for instance and ID of the room in which the source node 20 is located), or even an ID of the source node 20 which enables the voice assistant 40 to retrieve the position of the source node 20/user.

In case the source node 20 comprises several microphones, the digital audio signals at the output of said microphones can be used to estimate a direction of arrival, DoA, of the acoustic signal issued by the user with respect to the source node 20. The RSSI of said digital audio signals may also be used to estimate a distance between the source node 20 and the user. Hence, it is understood that the position of the user with respect to the source node 20 can also be estimated on the basis of the DoA and/or the RSSI (or distance), etc. The source node 20 can append such information to the voice command, as position information for the user. This position information is then retrieved by the voice assistant 40. Based on e.g. the position of the source node 20 and on the additional position information for the user (DoA, RSSI, etc.), the voice assistant 40 can estimate more accurately the position of the user.

The position of the source node 20 might be known a priori, or might be determined by e.g. the relay device 30. For instance, the version 5.1 of the Bluetooth protocol implements direction finding techniques, which can be used by the relay device 30 to determine the position of the source node 20. Hence, the relay device 30 can append the position of the source node 20 to the voice command, as position information for the user.

More generally speaking, the direction finding techniques of the version 5.1 of the Bluetooth protocol can be used to determine the position of any compliant Bluetooth-enabled network node of the wireless network 10. For instance, it is possible to determine, by the source node 20 or the relay device 30, the position of the mobile phone of the user, if compliant with the version 5.1 of the Bluetooth protocol. After the user has been identified (by e.g. processing the voice command), the source node 20 or the relay device 30 may assume that the position information for the user corresponds to the position of its mobile phone. According to another example, it is possible to determine the position of version 5.1 (or later) compliant Bluetooth-enabled response nodes, in order to be able to e.g. select the response node that is the closest to the user based on the position information for the user.

In some embodiments, when at least two source nodes 20 have received the same spoken request, the position of the user can be estimated by e.g. comparing the times of arrival, ToA, of the spoken request on these source nodes 20, and/or by comparing the RSSIs of the spoken request on these source nodes 20, etc.

In that case, the position information for the user can for instance be estimated by a relay device 30 connected to the source nodes 20 having received the same spoken request, and appended with the voice command. In that case, the relay device 30 may have to determine, as discussed above for the voice assistant 40, whether or not said voice commands correspond to a same request issued by a same user. When it is the case, the relay device 30 preferably computes an enhanced voice command and forwards only the enhanced voice command to the recipient voice assistant 40 with the position information. Alternatively, the relay device 30 may forward both voice commands and the corresponding position information.

Alternatively or in combination, the position information for the user can be estimated by the voice assistant 40 based on the input signals received. For instance, the input signals received can include, for each voice command, additional information such as the ToA of the spoken request on the corresponding source node 20, the RSSI of the spoken request on the corresponding source node 20, etc. Based on this additional information, and/or based on the voice commands, the voice assistant 40 can estimate the position information of the user, by applying methods known to the skilled person.

As discussed above, the wireless network 10 can comprise multiple source nodes 20, multiple relay devices 30, multiple voice assistants 40, and multiple response nodes 50. These multiple network nodes can be arranged in a variety of possible network topologies, and can use different wireless communication protocols. For example, the wireless network 10 can comprise one or more BLE mesh networks, and/or one or more Bluetooth piconets, and/or one or more Wi-Fi networks, etc.

Figure 4:
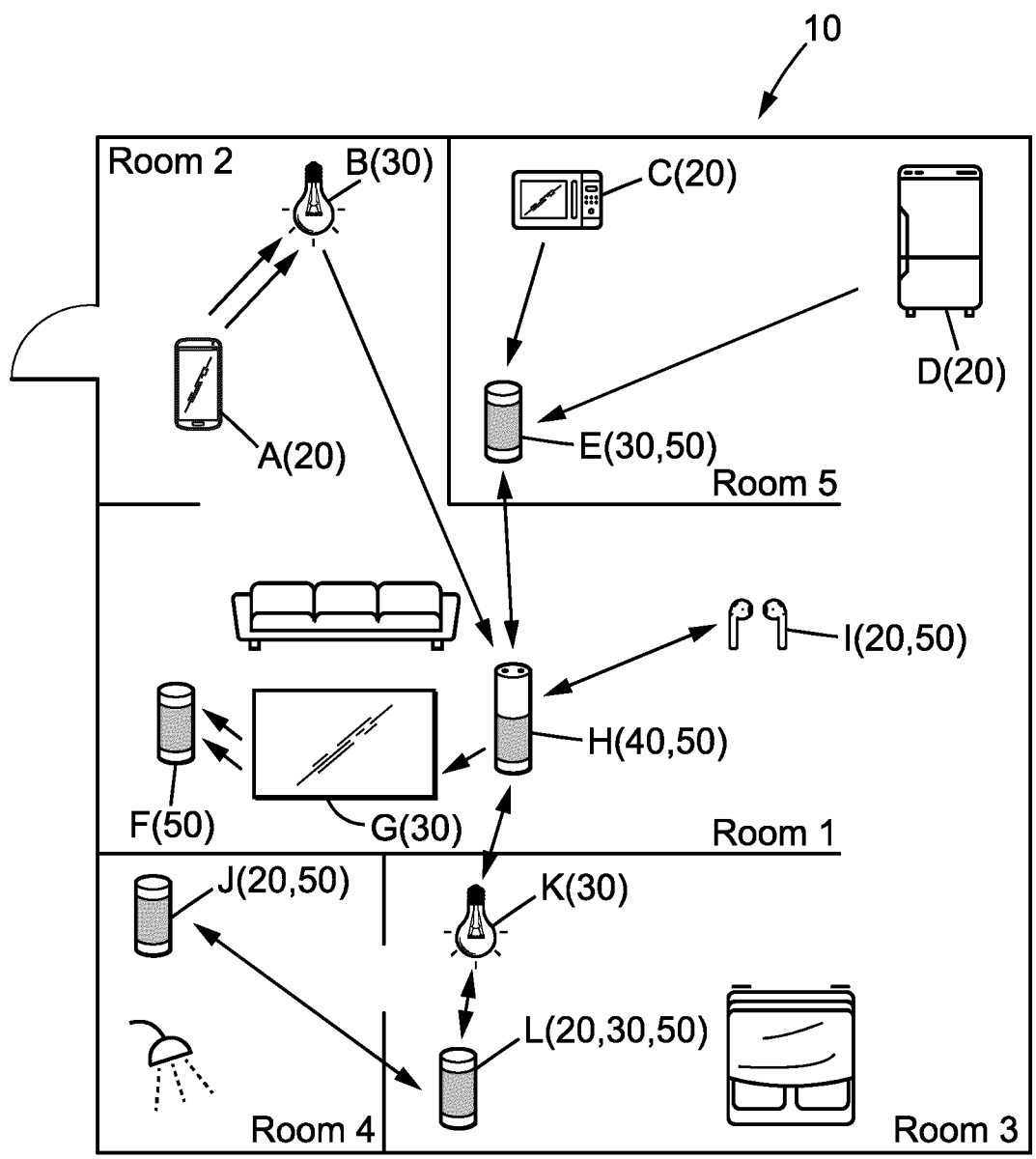
FIG. 4: a schematic representation of an exemplary wireless network comprising multiple source nodes and relay devices, and a voice assistant.

FIG. 4 represents schematically a non-limitative example of a wireless network 10 comprising a plurality of network nodes.

The exemplary wireless network 10 of FIG. 4 comprises twelve (12) network nodes referred to by respective letters from A to L.

For each network node A-L, the function is given between parentheses. For instance, the network node A(20) is only a source node 20, the network node B(30) is only a relay device 30, the network node E(30,50) is both a relay device 30 and a response node 50, the network node F(50) is only a response node 50, the network node H(40,50) is both a voice assistant 40 and a response node 50, the network node L(20,30,50) is a source node 20, a relay device 30 and a response node 50, etc.

FIG. 4 shows examples of wireless voice links which can be established between network nodes A-L. For instance, the wireless voice link from the network node A to the network node B is a broadcast voice link, the wireless voice link from the network node C to the network node E is a unidirectional voice link, the wireless voice link between the network node E and the network node H is a bidirectional voice link, etc.

For example, the wireless network 10 comprises two BLE mesh networks. The first BLE mesh network of the wireless network 10 comprises e.g. the network nodes C, D and E.

The second BLE mesh network of the wireless network 10 comprises e.g. the network nodes B, F, G, H, J, K and L. The wireless link between the network node E and the network node H uses e.g. the Wi-Fi protocol, such that the network nodes E and H form together a Wi-Fi network of the wireless network 10. In FIG. 4, the network nodes A and I are not considered to belong to a BLE mesh network or a WiFi network. However, the network node A is connected to the network node B (and to the first BLE mesh network) by a e.g. a Bluetooth wireless link, and the network node I is connected to the network node H (and to the second BLE mesh network) by a e.g. a Bluetooth wireless link.

As can be seen from FIG. 4, the network nodes A-L (source nodes, relay devices, voice assistants, response nodes) can be embedded in a variety of electronic devices, which include e.g. speakers, earphones, mobile phones, tablets, TVs, lamps, ovens, fridges, etc.

It is emphasized that the present invention is not limited to the above exemplary embodiments. Variants of the above exemplary embodiments are also within the scope of the present invention.

The above description clearly illustrates that by its various features and their respective advantages, the present disclosure reaches the goals set for it. In particular, by providing relay devices 30 for forwarding voice commands from source nodes 20 to a voice assistant 40, it is possible to expand the coverage area of said voice assistant 40, at a lower complexity increase than providing several standalone voice assistants, since said voice assistant 40 can process requests from users it in its vicinity and in the vicinity of any source node 20. Also, voice assistants 40 may be further configured to process multiple voice commands which correspond to a same request from a same user, in order to benefit from the diversity provided by the resulting wireless network 10.

The invention claimed is:

1. A relay device comprising a processing circuit and a wireless communication unit for connecting to a wireless network in an area corresponding to an apartment or a house or a building, said wireless network comprising a plurality of network nodes mutually connected by wireless links, wherein said relay device is configured to:
  receive, by the wireless communication unit, an input signal from a source node connected to the wireless network, said input signal comprising a voice command received by a microphone of the source node, said voice command to be processed by a voice assistant;
  determine, by the processing circuit and based on the input signal, a recipient voice assistant embedded in an electronic device located in said area, connected to the wireless network and adapted for processing said voice command;
  select, by the processing circuit, a path to the recipient voice assistant from a plurality of paths to the recipient voice assistant based on a topology of the wireless network, wherein the path comprises a plurality of network nodes via which the voice command is to be delivered to the recipient voice assistant; and
  transmit, by the wireless communication unit and towards the recipient voice assistant, an output signal comprising the voice command.

2. The relay device according to claim 1, wherein the wireless communication unit comprises at least one of the following:
  a Bluetooth communication unit;
  a Wi-Fi communication unit; or
  a Zigbee communication unit.

3. The relay device according to claim 1, wherein the processing circuit is configured to determine the recipient voice assistant by performing at least one of the following:
  extracting an identifier of said voice assistant within the wireless network from the input signal;
  searching for at least one predetermined word in the input signal; or
  using a topology of the wireless network.

4. The relay device according to claim 1, wherein the processing circuit is further configured to use said path when transmitting the voice command towards the recipient voice assistant.

5. A voice assistant, comprising a processing circuit and a wireless communication unit for connecting to a wireless network, said wireless network comprising a plurality of network nodes mutually connected by wireless links, wherein said voice assistant is configured to:
  receive, by the wireless communication unit, at least two input signals, each input signal comprising a voice command received by a microphone of a source node of the wireless network;
  determine, by the processing circuit, whether the voice commands of said input signals correspond to a same request issued by a single user;
  if said voice commands correspond to a same request issued by a single user: determine a single response to the voice commands based on at least one of said voice commands; and
  if said voice commands correspond to different requests: determine a response for each different voice command.

6. The voice assistant according to claim 5, wherein the processing circuit is further configured to, if said voice commands correspond to a same request issued by a single user, process said voice commands to produce an enhanced voice command, and determine the single response based on the enhanced voice command.

7. The voice assistant according to claim 5, wherein the processing circuit is further configured to improve a signal to noise ratio, SNR, of a voice command by combining digital audio signals obtained by different microphones which correspond to a same request issued by a single user.

8. The voice assistant according to claim 5, wherein the processing circuit is further configured to, if said voice commands correspond to a same request issued by a single user, process the corresponding input signals to determine a position information for the single user, and determine the single response based on the position information.

9. The voice assistant according to claim 5, wherein the processing circuit is further configured to, if an input signal includes a position information for the single user having issued the corresponding request, extract said position information from the input signal and determine the response based on the position information.

10. The voice assistant according to claim 8, wherein the determining the single response comprises: selecting at least one response node of the wireless network based on the position information for the single user, and commanding the at least one response node to perform at least one action determined in response to the same request.

11. A method for processing voice commands by a voice assistant connected to a wireless network, said wireless network comprising a plurality of network nodes mutually connected by wireless links, wherein said method comprises:

receiving at least two input signals, each input signal comprising a voice command received by a microphone of a source node of the wireless network;

determining whether the voice commands of said input signals correspond to a same request issued by a single user;

if said voice commands correspond to a same request issued by a single user: determining a single response to the voice commands based on at least one of said voice commands; and if said voice commands correspond to different requests: determining a response for each different voice command.

12. The voice assistant of claim 5, wherein the voice assistant is a node in a wireless network comprising a plurality of network nodes mutually connected by wireless links.

13. The voice assistant of claim 5, wherein the wireless network comprises at least one of the following:
   a Bluetooth Low Energy, BLE, mesh network;
   a Bluetooth piconet; or
   a Wi-Fi network.

14. The relay device according to claim 1, wherein the path that is selected is based on a number of network nodes corresponding to the plurality of network nodes, and the recipient voice assistant is determined based on the number of network nodes corresponding to the path.

15. The relay device according to claim 1, wherein the recipient voice assistant is determined based on a time required to reach the recipient voice assistant via the path that is selected.

* * * * *